United States Patent
Doida et al.

(10) Patent No.: US 8,270,753 B2
(45) Date of Patent: Sep. 18, 2012

(54) IMAGE PROCESSING DEVICE, COMPUTER PROGRAM PRODUCT, AND IMAGE PROCESSING METHOD TO RESTORE SIGNALS IN A SATURATED AREA

(75) Inventors: Shigeru Doida, Machida (JP); Hideaki Matsuda, Shinagawa-ku (JP)

(73) Assignee: Nikon Corporation, Tokyo (JP)

( * ) Notice: Subject to any disclaimer, the term of this patent is extended or adjusted under 35 U.S.C. 154(b) by 1220 days.

(21) Appl. No.: 11/918,726

(22) PCT Filed: Jun. 13, 2006

(86) PCT No.: PCT/JP2006/311844
§ 371 (c)(1),
(2), (4) Date: Oct. 18, 2007

(87) PCT Pub. No.: WO2006/134923
PCT Pub. Date: Dec. 21, 2006

(65) Prior Publication Data
US 2008/0212892 A1 Sep. 4, 2008

(30) Foreign Application Priority Data

Jun. 14, 2005 (JP) ................................. 2005-173806

(51) Int. Cl.
*G06K 9/40* (2006.01)
(52) U.S. Cl. ........ 382/274; 382/162; 382/190; 382/275; 250/205; 345/20; 345/63; 348/223.1
(58) Field of Classification Search ............... 382/162, 382/190, 274, 275; 250/205; 345/20, 63; 348/223.1
See application file for complete search history.

(56) References Cited

U.S. PATENT DOCUMENTS

| 6,072,526 A | * | 6/2000 | Hashimoto et al. | ........ 348/223.1 |
| 6,618,502 B1 | * | 9/2003 | Okada et al. | ................... 382/167 |
| 7,602,969 B2 | | 10/2009 | Yamada et al. | |
| 2002/0176621 A1 | | 11/2002 | Zhang et al. | |
| 2003/0174886 A1 | * | 9/2003 | Iguchi et al. | ................... 382/167 |
| 2005/0243175 A1 | | 11/2005 | Yamada et al. | |

FOREIGN PATENT DOCUMENTS

JP    A-08-331573    12/1996

(Continued)

OTHER PUBLICATIONS

Takaaki: "Method and device for correcting image"; JP11-191156, Jul. 1999, machine translation.* Apr. 19, 2011 Office Action issued in corresponding Application No. 2007-521304. (with Translation).

*Primary Examiner* — Chan S Park
*Assistant Examiner* — Eueng-nan Yeh
(74) *Attorney, Agent, or Firm* — Oliff & Berridge, PLC

(57) ABSTRACT

An image processing device includes: a saturated area extraction unit that extracts a saturated area corresponding to a saturated pixel from an image expressed by a color component signal of a predetermined color system corresponding to a pixel; a color information acquisition unit that acquires color information from a color component signal corresponding to a pixel contained in an area in contact with the saturated area of the image; and a color component signal modification unit that modifies a color component signal of a pixel in the saturated area so that color information on the saturated pixel contained in the saturated area approaches the color information acquired by the color information acquisition unit.

10 Claims, 10 Drawing Sheets

FOREIGN PATENT DOCUMENTS

| | | |
|---|---|---|
| JP | A-09-098437 | 4/1997 |
| JP | 11-191156 * | 7/1999 |
| JP | A-11-313338 | 11/1999 |
| JP | A-2000-125209 | 4/2000 |
| JP | A-2004-524635 | 8/2004 |
| JP | A-2006-211506 | 8/2006 |
| WO | WO 2004/010711 A1 | 1/2004 |

* cited by examiner

IMAGE PROCESSING DEVICE, COMPUTER PROGRAM PRODUCT, AND IMAGE PROCESSING METHOD TO RESTORE SIGNALS IN A SATURATED AREA

TECHNICAL FIELD

The present invention relates to image processing of an electronic image.

BACKGROUND ART

An image sensor that captures a subject image and outputs an image signal includes pixels. When strong light with intensity more than a certain level enters a pixel, an output signal from the pixel is saturated. Since signal values from all the saturated pixels are treated simply as being at a saturated level, the obtained image is observed as a so-called overexposed image. To avoid such saturation in a pixel, there is disclosed in Patent Document 1 a technology of providing groups of light-receiving elements having different imaging sensitivities in combination, so that when output signals from a group of light-receiving elements having a higher imaging sensitivity are saturated, output signals from a group of light-receiving elements having a lower imaging sensitivity can be used, thus preventing the occurrence of overexposed images.

Patent Document 1: Japanese Laid-open Patent Publication No. 2000-125209

DISCLOSURE OF THE INVENTION

Problem to Be Solved by the Invention

To use a group of light-receiving elements having a higher imaging sensitivity and a group of light-receiving elements having a lower imaging sensitivity in combination in an image sensor is a factor of cost rise. Accordingly, it is desirable not to use such a special image sensor having groups of light-receiving elements having high and low sensitivities in combination but to use a common image sensor constituted by a group of light-receiving elements having a single imaging sensitivity, and a technology of correcting saturated signals from saturated pixels in such a common image sensor when saturation occurs in the pixels is demanded.

Means for Solving the Problem

According to the 1st aspect of the present invention, an image processing device comprises: a saturated area extraction unit that extracts a saturated area corresponding to a saturated pixel from an image expressed by a color component signal of a predetermined color system corresponding to a pixel; a color information acquisition unit that acquires color information from a color component signal corresponding to a pixel contained in an area in contact with the saturated area of the image; and a color component signal modification unit that modifies a color component signal of a pixel in the saturated area so that color information on the saturated pixel contained in the saturated area approaches the color information acquired by the color information acquisition unit.

According to the 2nd aspect of the present invention, in the image processing device according to the 1st aspect, it is preferred that the color component signal representing the image is data of a RAW format.

According to the 3rd aspect of the present invention, in the image processing device according to the 1st or 2nd aspect, it is preferred that the saturated pixel corresponds to a pixel of adjacent pixels in which at least one color component signal from among a plurality of corresponding color component signals is saturated.

According to the 4th aspect of the present invention, the color processing device according to any one of the 1st to 3rd aspects, it is preferred that the saturated area extraction unit extracts the saturated area from a skin color area of the image.

According to the 5th aspect of the present invention, the color processing device according to any one of the 1st to 4th aspects, it is preferred that the color information includes signal ratios of a plurality of color component signals corresponding to pixels.

According to the 6th aspect of the present invention, in the image processing device according to the 5th aspect, it is preferred that the color component signal modification unit judges whether or not all of a plurality of color component signals corresponding to the saturated pixel are saturated, and if all the color component signals are saturated, selects from among the plurality of color component signals a signal of a color component having a narrowest range of saturated area as a criterion signal, and calculates the criterion signal using color component signals corresponding to pixels contained in an area in contact with the saturated area of the image, and modifies the color component signal of the saturated pixel based on the calculated criterion signal and the signal ratios of the plurality of color component signals to the criterion signal.

According to the 7th aspect of the present invention, in the image processing device according to the 5th or 6th aspect, it is preferred that when one or more color component signals that are unsaturated are present among the plurality of color component signals corresponding to the saturated pixel, the color component signal modification unit selects a color component signal that has a smallest signal value among the color component signals as a criterion signal and modifies the color component signal of the saturated pixel based on the criterion signal and the signal ratios of the plurality of color component signals.

According to the 8th aspect of the present invention, in the image processing device according to the 6th or 7th aspect, it is preferred that there is further provided a luminance decreasing unit that decreases a luminance level of the image represented by the modified color component signals when the color component signals have been modified by the color component signal modification unit.

According to the 9th aspect of the present invention, in the image processing device according to the 6th or 7th aspect, it is preferred that there is further provided a smoothing unit that smoothes the color component signals so that the color component signals gradually change between the saturated area and an area in contact with the saturated area.

According to the 10th aspect of the present invention, a computer-readable computer program product comprises an image processing program. The image processing program comprises: a saturated area extraction instruction for extracting a saturated area corresponding to a saturated pixel from an image expressed by a color component of a predetermined color system corresponding to an pixel; a color information acquisition instruction for acquiring color information from a color component signal corresponding to a pixel contained in an area in contact with the saturated area of the image; and a color component signal modification instruction for modifying a color component signal of a pixel in the saturated area so that color information of the saturated pixel approaches the acquired color information.

According to the 11th aspect of the present invention, an image processing method comprises: extracting a saturated area corresponding to a saturated pixel from an image expressed by a color component signal of a predetermined color system corresponding to a pixel; acquiring color information from a color component signal corresponding to a pixel contained in an area in contact with the saturated area of the image; and modifying a color component signal of a pixel in the saturated area so that color information on the saturated pixel contained in the saturated area approaches the acquired color information.

According to the 12th aspect of the present invention, an image processing method comprises restoring a color component signal in a saturated area corresponding to a saturated pixel for a single image expressed by color component signals of a predetermined color system corresponding to the pixel.

ADVANTAGEOUS EFFECT OF THE INVENTION

According to the present invention, pixels in the saturated area contained in the captured color image can be corrected.

BEST MODE FOR CARRYING OUT THE INVENTION

The image processing device according to the present invention corrects a saturation signal contained in signals of a color electronic image. The electronic color image which is an object of correction processing by the image processing device includes an image captured by an image sensor including, for example, a CCD image sensor. The image sensor captures a subject image formed on an imaging plane of the image sensor. The image signal output from the image sensor differs in signal level depending on the intensity of light entering each pixel.

On the imaging plane of the image sensor is provided a color separation filter having a Bayer array of R (red), G (green), and B (blue) corresponding to positions of respective light-receiving elements of the image sensor. The image sensor takes an image of the subject through the color separation filter so that the signal output from the image sensor has information on any one of R, G, and B for one pixel. That is, an R color signal is output from the pixel corresponding to the R color filter, a G color signal is output from the pixel corresponding to the G color filter, and a B color signal is output from the pixel corresponding to the G color filter.

Generally, the output from the light-receiving element that constitutes a pixel of the image sensor is converted into digital data by an AD converter. The value range that can be handled by the AD converter is limited. For example, when a 12-bit AD converter is used, the data range that can be handled is 0 to 4,095. If strong light having intensity higher than a predetermined level is entered, saturation occurs and the output signal value of the AD converter will not change any longer. In the present invention, each of a group of adjacent pixels that shows a possible maximum value in relation to any one of the R component, G component, and B component is called "saturated pixel" and an image signal corresponding to a saturated pixel is called a "saturated signal".

Figure 1:
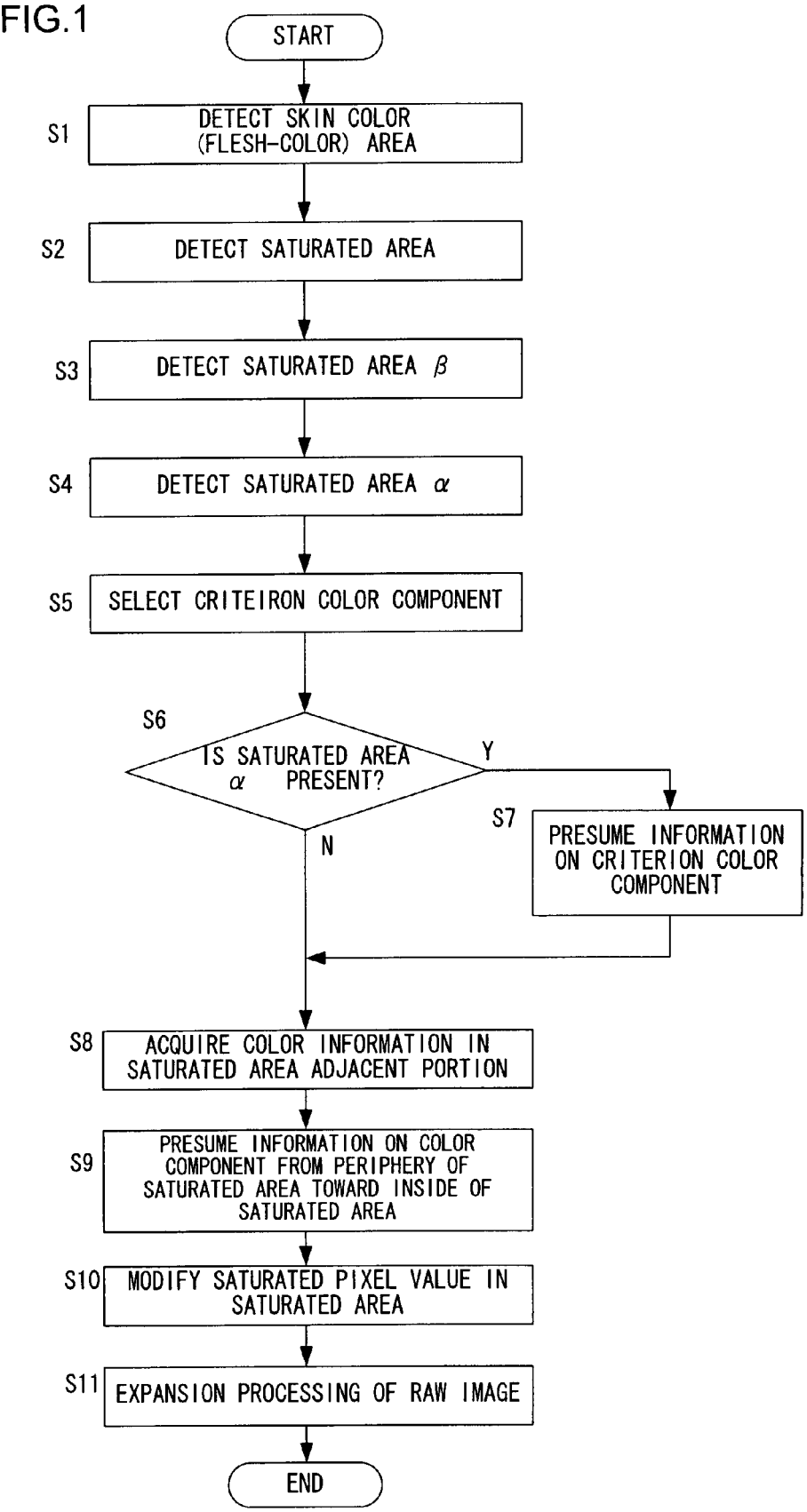
FIG. 1 is a flowchart explaining the flow of the process by an image processing program.
Figure 2:
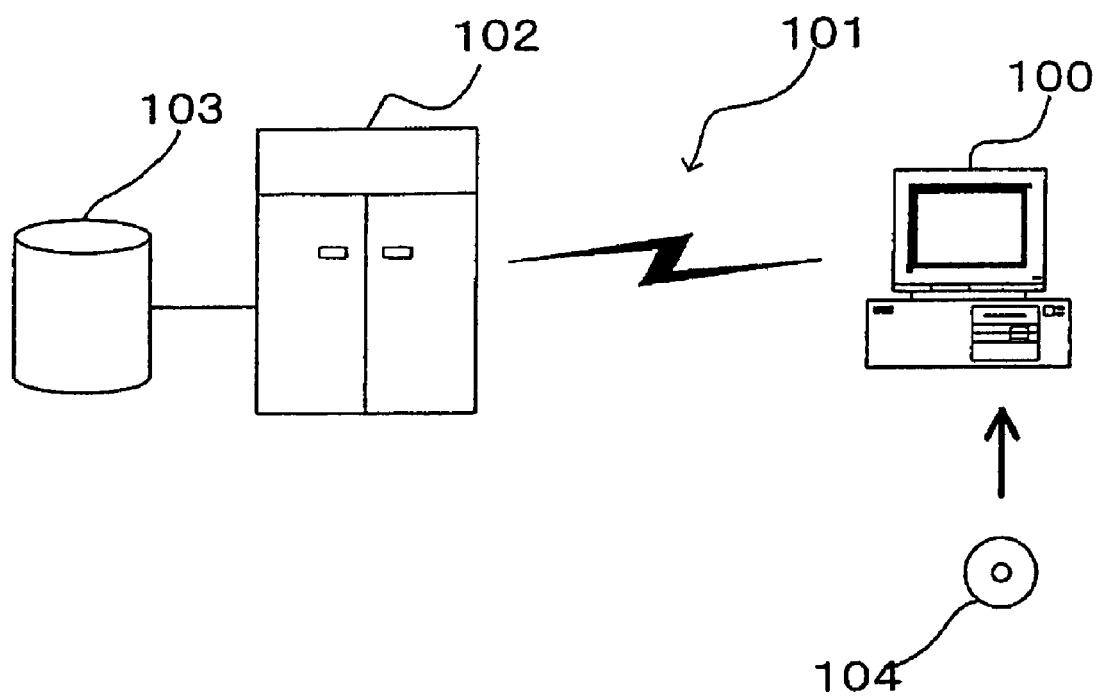
FIG. 2 is a diagram explaining a computer device that executes a program.

Hereinafter, an embodiment of the present invention is explained referring to the drawings. FIG. 1 is a flowchart illustrating the flow of operations by an image processing program. In the present embodiment, an image processing device is implemented by causing a computer device 100 shown in FIG. 2 to execute a program for executing the process shown in FIG. 1. When an image processing program is to be used on a personal computer 100, the program is loaded on a data storage device of the personal computer 100 and then the program is executed so that the computer can be used as an image processing device.

The loading of the program on the personal computer 100 may be performed either by setting a recording medium 104 such as a CD-ROM having stored the program in the personal computer 100 or by loading the program on the personal computer 100 through a communication line 101 such as the Internet. When the loading is performed through the communication line 101, the program is stored in a hard disk drive 103 of a server (computer) 102 connected to the communication line 101. In addition, when the loading is performed through the communication line 101, the program is carried on a carrier wave as a data signal. As described above, the program may be supplied as a computer program product in various forms such as a recording medium 104 or data signals through the communication line 101.

In step S1 in FIG. 1, a CPU of the computer device 100 (FIG. 2) detects a skin color (flesh-color) area in the color electronic image which is a subject of the processing and the procedure proceeds to step S2. Specifically, when a color component signal (R, G, B) expressed by an RGB color system, which is a signal indicative of a color of a pixel that constitutes a color electronic image, has a component R, G, or B with a signal ratio within a predetermined range, the position of the pixel is deemed to be a skin color area in the color electronic image. Generally, in the skin color area, the ratio of the component B is smaller than the ratios of the components R and G. It is to be noted that the color component signals (R, G, B) achieve data of a RAW format to which no signal processing such as white balance processing or gamma correction processing is applied.

Detection of the skin color area may be performed by a method of extracting a specified pattern such as face in the image (so-called face detection) and a method of detecting an area designated and input via the pointing device (not shown) of the personal computer 100 as well as the method of color judgment using signal ratios of the color components.

In step S2, the CPU detects a saturated area for a color component signal (R, G, B) contained in the skin color area detected in step S1 and the procedure proceeds to step S3. The saturated area is an area that corresponds to the saturated pixel in the color electronic image. The CPU deems a pixel to be a saturated pixel, for example, if at least one color component has a signal value equal to 4,095 or more when the color component signal is digitized using a 12-bit output (full scale 4,095) A/D converter.

In step S3, the CPU detects a saturated area β and the procedure proceeds to step S4. The saturated area β is an area that corresponds to a series of pixels in which one or two color components are saturated, in the saturated area described above.

In step S4, the CPU detects a saturated area α and the procedure proceeds to step S5. The saturated area α is defined to be an area that includes pixels in which all the three color component signals are saturated, in the saturated area β described above.

Figure 3:
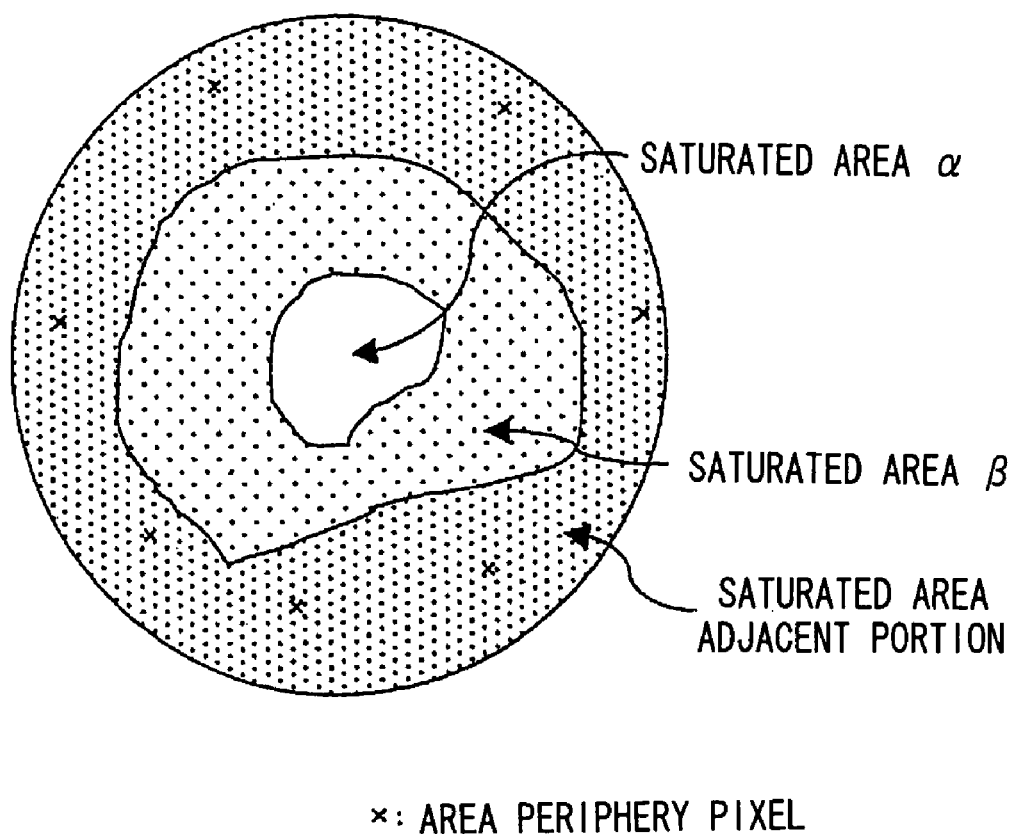
FIG. 3 is a diagram illustrating a saturated area of a color electronic image.

FIG. 3 is a diagram explaining distribution of the saturated area of a color electronic image which is an object to be processed. As shown in FIG. 3, when the saturated area β and the saturated area α are present, the saturated area β is present as surrounded by saturated area adjacent portions and the saturated area α is present in the saturated area β. In the saturated area adjacent portion, no saturated area is present (three color component signals are all unsaturated).

Figure 4:
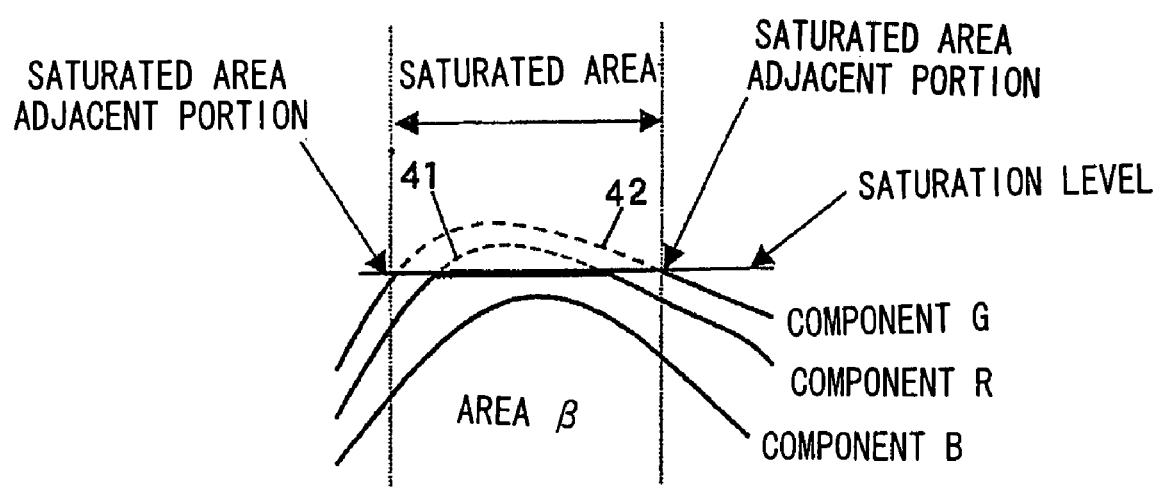
FIG. 4 is a diagram illustrating a saturated area β and color component signals of a pixel contained in the saturated area β.

FIG. 4 is a diagram explaining a saturated area β and color component signals (Rs, Gs, Bs) of pixels contained in the saturated area β. The horizontal axis represents the position of a pixel and the vertical axis represents a signal value. In FIG. 4, at least the signal of the B color component is unsaturated and at least one of the signals of the components R and G is saturated. The saturated signal remains at the saturation level and does not change. A broken line 41 exemplifies a signal curve that would have been obtained if the signal of R color component has not been saturated while a broken line 42 exemplifies a signal curve that would have been obtained if the signal of G color component has not been saturated.

Figure 5:
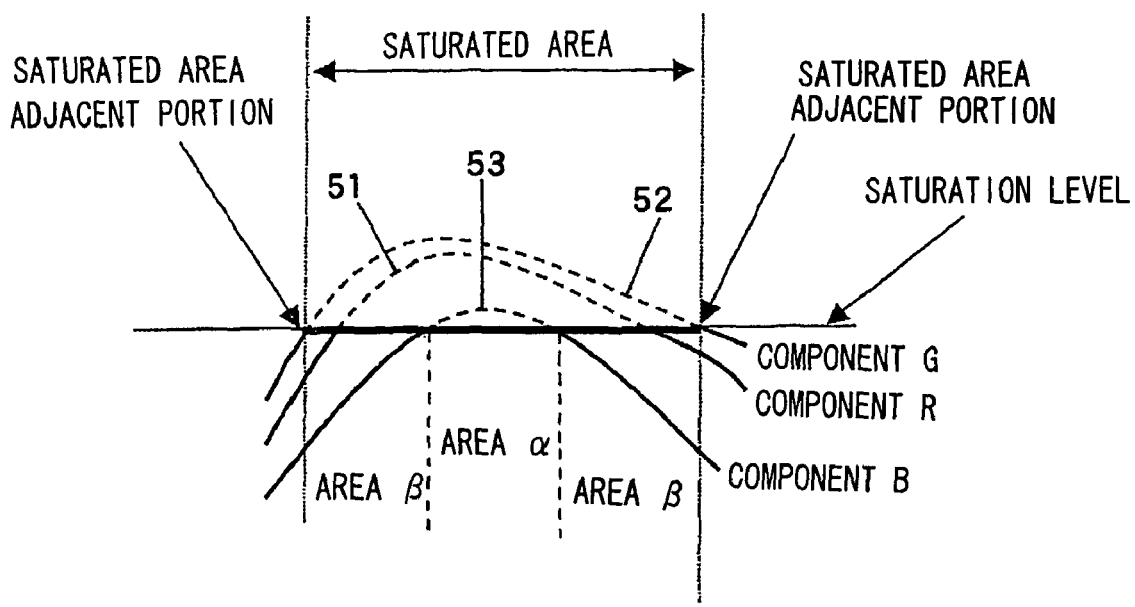
FIG. 5 is a diagram illustrating saturated areas α and β and color component signals of pixels contained in the saturated areas α and β.

FIG. 5 is a diagram explaining color component signals (Rs, Gs, Bs) of pixels contained in the saturated area β and the saturated area α. The horizontal axis represents the position of a pixel and the vertical axis represents a signal value. In FIG. 5, at least the signal of the B color component is unsaturated and at least one of the signals of the components R and G is saturated. The saturation signal remains at the saturation level and does not change. In the saturated area α, all the color component signals are saturated. The saturation signal remains at the saturation level and does not change. A broken line 51 exemplifies a signal curve that would have been obtained if the signal of R color component has not been saturated while a broken line 52 exemplifies a signal curve that would have been obtained if the signal of G color component has not been saturated. In addition, a broken like 53 exemplifies a signal curve that would have been obtained if the signal of the B color component has not been saturated.

In step S5 in FIG. 1, the CPU selects a color component which serves as a criterion as described below and the procedure proceeds to step S6. That is, for the saturated area α, the CPU selects the color component of which the range of saturated area (range in which saturated pixels are contiguous) is narrowest (B color component in the example shown in FIG. 5), and for the saturated area β, the CPU selects the color component having the smallest signal value among unsaturated color components (B color component in the examples shown in FIGS. 4 and 5).

In step S6, the CPU judges whether or not the saturated area α is present. When the saturated area α is detected in step S4, the CPU makes an affirmative judgment in step S6 and the procedure proceeds to step S7. When no saturated area α is detected in step S4, the CPU makes a negative judgment in step S6 and the procedure proceeds to step S8. If the procedure proceeds to step S8, the signal of the B color component having the smallest signal value among the unsaturated color components is defined as criterion color component information Bb in the saturated area β.

Figure 6:
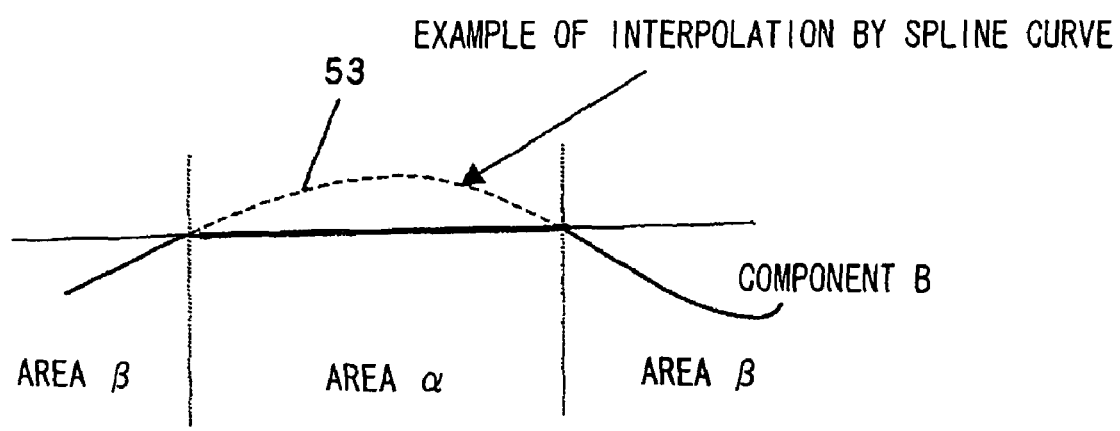
FIG. 6 is a diagram presenting an excerpt of the B color component signals in FIG. 5.

In step S7, the CPU makes a presumption on information on a criterion color component and the procedure proceeds to step S8. FIG. 6 is a diagram illustrating an excerpt of the signal on the B component in FIG. 5. The CPU makes a presumption of a curve 53 in the saturated area α that would have been obtained if the signal has not been saturated on the color component selected in step S5 (B color component in the present example).

On this occasion, the presumption is performed by obtaining changes (inclinations) in signal value of the B color component in the saturated areas β positioned on both sides of the saturated area α such that saturated areas β sandwich the saturated area α therebetween and applying conventional spline interpolation processing to the inclinations. On this occasion, the spline curve preferably is of a quadratic expression. However, a higher order expression higher than a cubic expression may also be used. When the saturated area β has a narrow range, the inclination of a signal may be advantageously obtained by using not only the signal value of the saturated area β but also signal values of the B color components contained in the saturated area adjacent portions. As a result, a curve 53 in a broken line can be obtained. The CPU defines the signal represented by the curve 53 of the B color component as criterion color component information Bb at the saturated area α. It is to be noted that the presumption of the curve 53 may be performed by a known technique other than the spline interpolation processing.

In step S8, the CPU acquires color information on a pixel contained in the saturated area adjacent portions contiguous with the saturated area β (area periphery pixel (FIG. 3)) and the procedure proceeds to step S9. The color information includes, for example, a color component ratio of a color component signal (R, G, B) corresponding to the area periphery pixel. It is preferred that the color information is acquired about a pixel that is close to the saturated area β.

In step S9, the CPU makes a presumption on color component information from the periphery of the saturated area toward the inside of the saturated area β and the procedure proceeds to step S10. On this occasion, the presumption is performed by aligning color component ratios of the color component signals (Rs, Gs, Bs) in the saturated areas β and α with the color component ratios of the color component signals (R, G, B) corresponding to the area periphery pixels acquired in step S8. The CPU multiplies the criterion color component information (B color component Bb in the present example) by the color component ratio of the R color component acquired in step S8 and the color component ratio of the G color component acquired in step S8 to calculate signal Rr of the R color component and signal Gr of the G color component, respectively.

Figure 7:
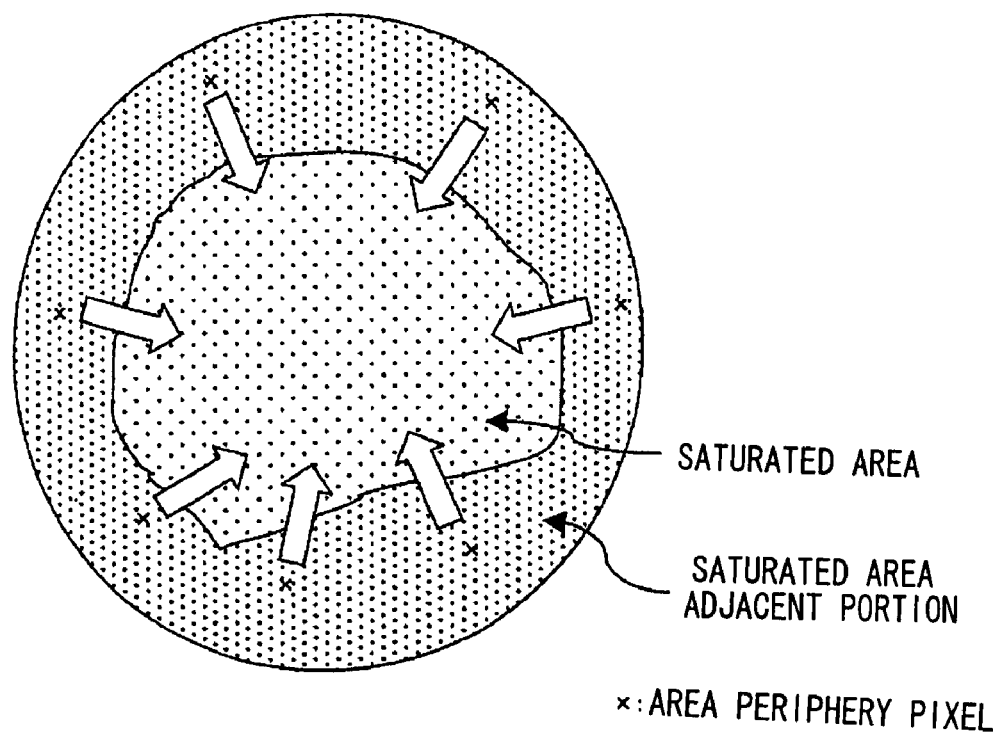
FIG. 7 is a diagram explaining the procedure in step S9.
Figure 8:
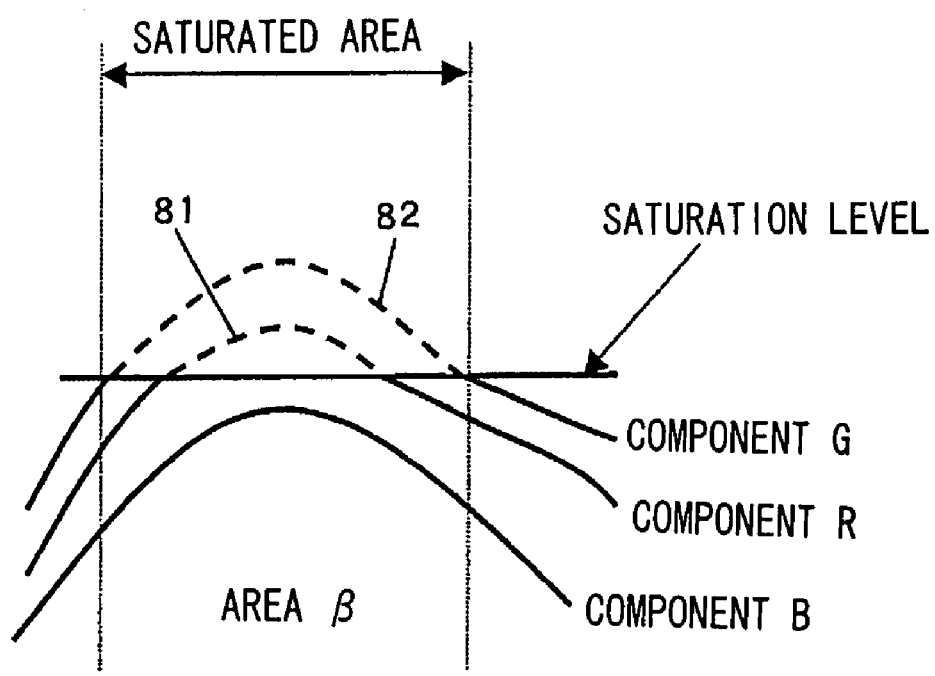
FIG. 8 is a diagram illustrating presumed distribution of color component signals of pixels.

FIG. 7 is a diagram explaining the processing in step S9. As shown by arrows in FIG. 7, presumption is made in each direction, from the area periphery pixels contained in the saturated area adjacent portion toward the inside of the saturated area β. Then, the color component signals (Rr, Gr) of each pixel in the saturated area is presumed. FIG. 8 is a diagram explaining the G color component and R color component presumed in step S9. As a result, as indicated by a curve 81 shown in a broken line in FIG. 8, the signal of the R color component is obtained. In addition, as indicated by a curve 82 shown in a broken line in FIG. 8, the signal of the G color component is obtained. Also, when the saturated area α as shown in FIG. 5 is present, the color component signals of each pixel can be similarly obtained. In the following steps, the same procedure is performed regardless of the presence or absence of the saturated area α, so that explanation is made only on the case having the saturated area shown in FIG. 4.

In step S10, the CPU modifies (replaces) the signal Rs of the R component and the signal Gs of the G component among the color component signals (Rs, Gs, Bs) corresponding to the pixels contained in the saturated areas α and β to(by) the signal Rr shown in the curve 81 and the signal Gr shown in the curve 82, respectively, and the procedure proceeds to step S11. This provides the color component signals (Rr, Gr, Bs) on the saturated areas α and β, respectively. It is to be noted that the color component signals of pixels contained in the saturated area adjacent portions need not be modified and the color component signals (R, G, B) may be retained as they are.

In step S11, the CPU performs expansion processing of a RAW image. In the expansion processing, the color component having the greatest signal value is selected from among the signal curves presumed in step S9, and the luminance level of the whole color electronic image is multiplied by a gain having a value smaller than 1, so that the maximum of the curve 82 of the G color component can be decreased to below a saturation level. Specifically, when the saturation level is 4,095 and a range of reduction is d, a gain represented by (4,095/(4,095+d)) is multiplied. Regarding the saturated areas α and β, the color component signals (Rr, Gr, Bs) are multiplied by a similarly set gain to reduce the value thereof. Also, the color component signals (R, G, B) for other areas including the saturated area adjacent portions are also similarly multiplied by a gain to reduce the value thereof.

Figure 9:
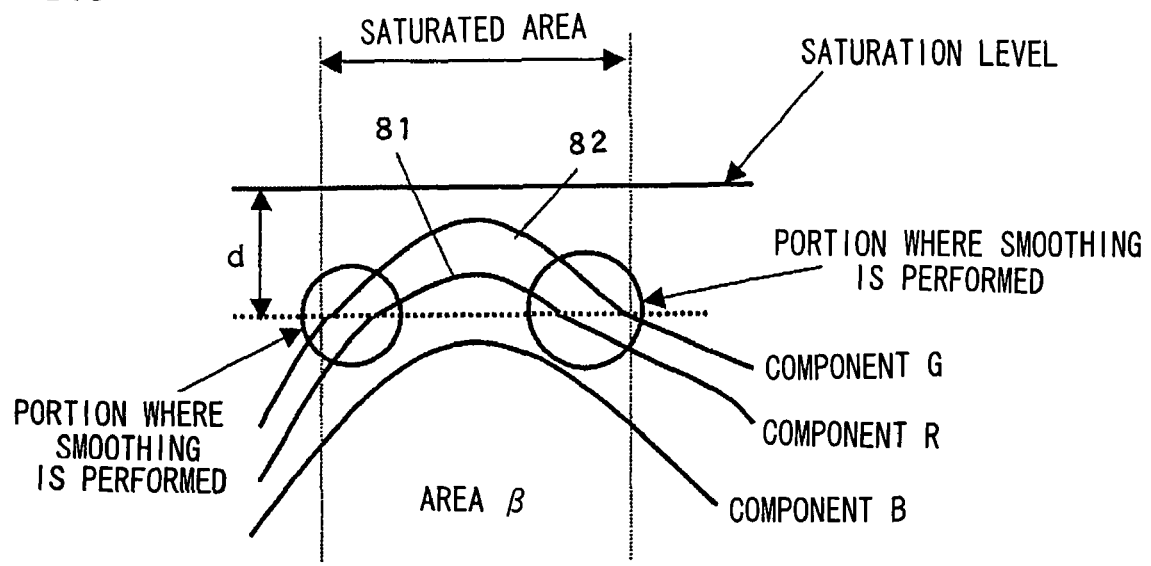
FIG. 9 is a diagram explaining the procedure in step S11.

FIG. 9 is a diagram explaining the processing in step S11. In the same manner as in FIG. 4, the horizontal axis represents the position of a pixel and the vertical axis represents a signal value. FIG. 9 indicates that a reduction in luminance level results in a signal value of each color component expressed to be lower than the saturation level. The CPU further performs smoothing processing for smoothing a discontinuous portion of the color component signal so that the color component signal can change gradually between the boundary of the saturated areas β and α. After the processing in step S11 is performed, the CPU ends a series of processing shown in FIG. 2.

According to the embodiment explained above, the following advantageous effects can be obtained.

(1) In a color electronic image, signals of color components saturated in the saturated area are presumed so that the color component ratios of signals at portions where pixels are saturated (saturated area) are aligned with the color component ratios of signals at portions where the pixels are not saturated (saturated area adjacent portions). Therefore, restoration processing of saturated signals may be performed after imaging on single image data captured at a common sensitivity without making different sensitivities among light-receiving elements of the image capturing device. In addition, color component ratios are aligned between the saturated area and unsaturated area, so that images can be restored in a more natural color giving less unpleasant sensation to the observer of the images.

(2) Restoration of saturated signals on skin color portion of electronic images is performed, so that overexposure of the skin color portion that gives visually severer adverse influence as compared with other colors can be effectively inhibited. Generally, skin color has a smooth gradation and has a less change in hue, the restoration method according to the embodiment of the present invention in which the color component ratios are aligned between the saturated area and unsaturated area is particularly effective. Further, skin color has a signal ratio of the B component which is smaller than the signal ratios of the components R and G, so that it is highly possible that the signal of at least the B color component is not saturated and retains gradation information. Therefore, as compared with the case where signals of all the color components are saturated, the image can be restored in a more natural color.

(3) On the boundary between the saturated area and unsaturated area, a discontinuous portion in change of color component signals is smoothed so that the color of the image after restoration does not show a stepwise change in the boundary portion, thus allowing restoration of images giving less unpleasant sensation to the observer of the images.

While in the above explanation, data in a RAW format is processed to restore saturated signals, the present invention may be applied to data of a format other than the RAW format, such as data of a JPEG format.

While the saturated area is detected in the skin color area, the restoration processing of the saturated signals may be performed on areas other than the skin color area. On this occasion, step S1 may be omitted and the procedure may be adapted to begin with step S2.

While explanation has been made on the case where the threshold of judgment to deem a pixel as saturated is set to a signal value of 4,095, the threshold for judgment may be changed as appropriate, for example, to 4,000 or more. In addition, while the case where color signals are expressed as 12-bit data has been explained, the present invention may be applied to cases where other bit (14-bit, 16-bit, etc.) data are used.

In the explanation on step S11, explanation has been made on the case where the smoothing processing is performed at the boundary between the saturated area β and the saturated area adjacent portions. However, when the saturated area α is present, the smoothing processing may be performed between the saturated area α and the saturated area β.

While explanation has been made on the example in which the color electronic image is expressed by primary color image signals taken through an RGB color separation filter, the present invention may be applied to images expressed by complementary color image signals taken through a complementary color separation filter. It is to be noted that the number of color separation is not limited to three but may be four.

The image processing program as illustrated in FIG. 1 may be implemented on an electronic camera. In this case, the electronic camera records both the image signals after restoration processing of saturated signals and the image signals on which no restoration processing of saturated signals has been performed. It is to be noted that depending on the contents of functions set to the electronic camera, the electronic camera may be configured to record only one of the image signals described above.

Figure 10:
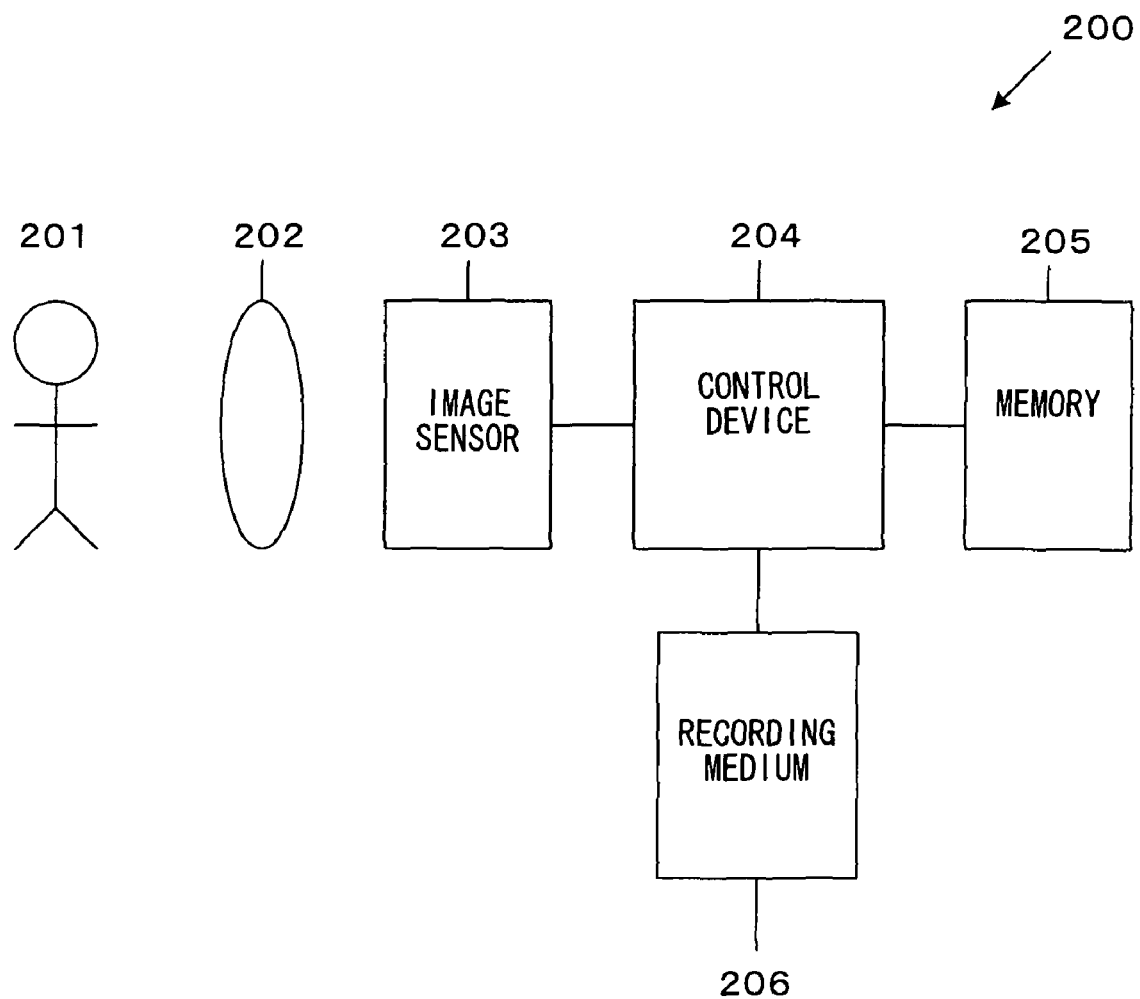
FIG. 10 is a diagram illustrating the configuration of an electronic camera.

FIG. 10 is a diagram showing the configuration of the electronic camera (digital camera) 200. An image sensor 203 captures an image of a subject 201 through a photographic lens 202. A control device 204 generates an electronic image data based on output signals from the image sensor 203 and once stores the electronic image data in a memory 205. The control device 204 performs an image restoration process of the saturated signals described above onto the electronic image data stored in the memory 205 and records both the image signals after restoration processing of saturated signals and the image signals on which no restoration processing of saturated signals has been performed as electronic image data in a recording medium 206 such as a memory card. The processing can be performed by executing an image processing program stored in the memory 205.

The above explanation is only exemplary and the interpretation of the present invention as claimed is not limited by the correspondence between the elements in the embodiment described above and elements of the present invention.

The invention claimed is:

1. An image processing device comprising:
a computer, wherein:
the computer
extracts a saturated area corresponding to a saturated pixel from an image expressed by a color component signal of a predetermined color system corresponding to a pixel,
acquires color information from a color component signal corresponding to a pixel contained in an area in contact with the saturated area of the image, and
modifies a color component signal of a pixel in the saturated area so that color information on the saturated pixel contained in the saturated area approaches the color information acquired by the computer; wherein
the color information includes signal ratios of a plurality of color component signals corresponding to pixels; and
the computer judges whether or not all of a plurality of color component signals corresponding to the saturated pixel are saturated, and if all the color component signals are saturated, selects from among the plurality of color component signals a signal of a color component having a narrowest range of saturated area as a criterion signal, and calculates the criterion signal using color component signals corresponding to pixels contained in an area in contact with the saturated area of the image, and modifies the color component signal of the saturated pixel based on the calculated criterion signal and the signal ratios of the plurality of color component signals to the criterion signal.

2. The image processing device according to claim 1, wherein:
the color component signal representing the image is data of a RAW format.

3. The image processing device according to claim 1, wherein:
the saturated pixel corresponds to a pixel of adjacent pixels in which at least one color component signal from among a plurality of corresponding color component signals is saturated.

4. The color processing device according to claim 1, wherein:
the computer extracts the saturated area from a skin color area of the image.

5. The image processing device according to claim 1, wherein:
when one or more color component signals that are unsaturated are present among the plurality of color component signals corresponding to the saturated pixel, the computer selects a color component signal that has a smallest signal value among the color component signals as a criterion signal and modifies the color component signal of the saturated pixel based on the criterion signal and the signal ratios of the plurality of color component signals.

6. The image processing device according to claim 1, wherein:
the computer decreases a luminance level of the image represented by the modified color component signals when the color component signals have been modified by the computer.

7. The image processing device according to claim 1, wherein:
the computer smoothes the color component signals so that the color component signals gradually change between the saturated area and an area in contact with the saturated area.

8. A non-transitory computer-readable computer program product, comprising:
an image processing program, wherein
the image processing program comprises:
a saturated area extraction instruction for extracting a saturated area corresponding to a saturated pixel from an image expressed by a color component of a predetermined color system corresponding to an pixel;
a color information acquisition instruction for acquiring color information from a color component signal corresponding to a pixel contained in an area in contact with the saturated area of the image; and
a color component signal modification instruction for modifying a color component signal of a pixel in the saturated area so that color information of the saturated pixel contained in the saturated area approaches the acquired color information, wherein
the color information includes signal ratios of a plurality of color component signals corresponding to pixels; and
the color component signal modification instruction judges whether or not all of a plurality of color component signals corresponding to the saturated pixel are saturated, and if all the color component signals are saturated, selects from among the plurality of color component signals a signal of a color component having a narrowest range of saturated area as a criterion signal, and calculates the criterion signal using color component signals corresponding to pixels contained in an area in contact with the saturated area of the image, and modifies the color component signal of the saturated pixel based on the calculated criterion signal and the signal ratios of the plurality of color component signals to the criterion signal.

9. An image processing method comprising:
extracting a saturated area corresponding to a saturated pixel from an image expressed by a color component signal of a predetermined color system corresponding to a pixel;
acquiring color information from a color component signal corresponding to a pixel contained in an area in contact with the saturated area of the image; and
modifying a color component signal of a pixel in the saturated area so that color information on the saturated pixel contained in the saturated area approaches the acquired color information, wherein
the color information includes signal ratios of a plurality of color component signals corresponding to pixels; and
judging whether or not all of a plurality of color component signals corresponding to the saturated pixel are saturated, and if all the color component signals are saturated, selecting from among the plurality of color component signals a signal of a color component having a narrowest range of saturated area as a criterion signal, and calculating the criterion signal using color component signals corresponding to pixels contained in an area in contact with the saturated area of the image, and modifying the color component signal of the saturated pixel based on the calculated criterion signal and the signal ratios of the plurality of color component signals to the criterion signal.

10. An image processing device comprising:
a computer, wherein:
the computer
extracts a saturated area corresponding to a saturated pixel from an image expressed by a color component signal of a predetermined color system corresponding to a pixel,
acquires color information from a color component signal corresponding to a pixel contained in an area in contact with the saturated area of the image, and
modifies a color component signal of a pixel in the saturated area so that color information on the saturated pixel contained in the saturated area approaches the color information acquired by the computer;
the color information includes signal ratios of a plurality of color component signals corresponding to pixels; and
the computer judges whether or not all of a plurality of color component signals corresponding to the saturated pixel are saturated, and if all the color component signals are saturated, selects a signal from among the plurality of color component signals as a criterion signal, and calculates the criterion signal using color component signals corresponding to pixels contained in an area in contact with the saturated area of the image, and modifies the color component signal of the saturated pixel based on the calculated criterion signal and the signal ratios of the plurality of color component signals to the criterion signal.

* * * * *